No. 804,567. PATENTED NOV. 14, 1905.
F. TAUZIN & H. LAURY.
ANNOUNCING DEVICE OR HORN FOR BOATS, AUTOMOBILES, AND OTHER VEHICLES.
APPLICATION FILED JUNE 6, 1905.
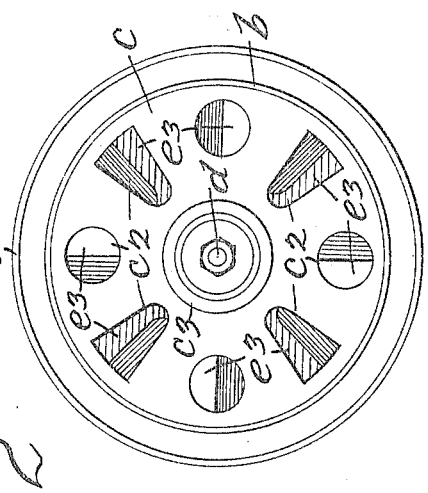
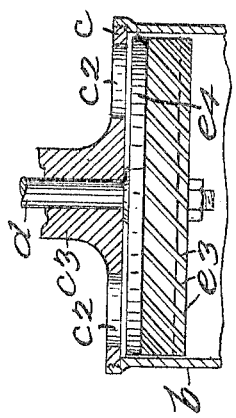
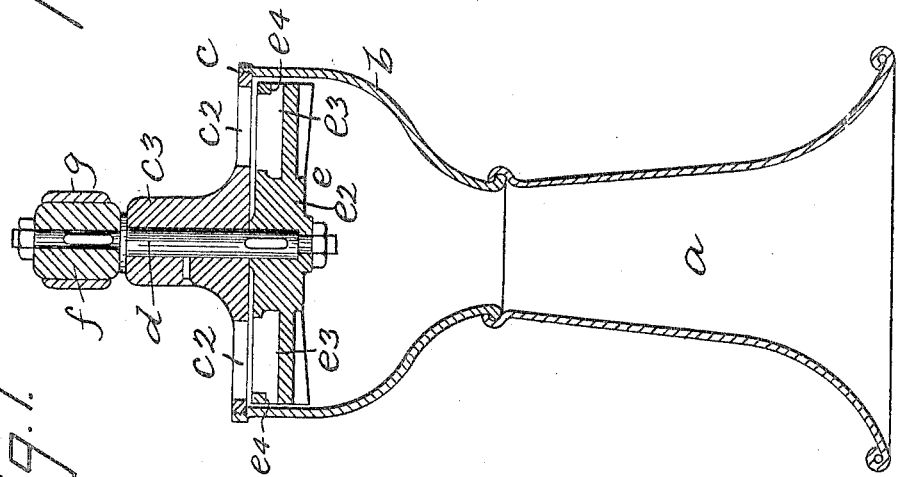
WITNESSES
J. E. Larsen
F. A. Stewart
INVENTORS
Ferdinand Tauzin
Henry Laury
BY Edgar Sater & Co
ATTORNEYS

UNITED STATES PATENT OFFICE.

FERDINAND TAUZIN AND HENRY LAURY, OF PARIS, FRANCE.

ANNOUNCING DEVICE OR HORN FOR BOATS, AUTOMOBILES, AND OTHER VEHICLES.

No. 804,567.       Specification of Letters Patent.       Patented Nov. 14, 1905.

Application filed June 6, 1905. Serial No. 263,919.

*To all whom it may concern:*

Be it known that we, FERDINAND TAUZIN and HENRY LAURY, citizens of France, residing at Paris, France, have invented certain new and useful Improvements in Announcing Devices or Horns for Boats, Automobiles, and other Vehicles, of which the following is a specification, such as will enable those skilled in the art to which it appertains to make and use the same.

This invention relates to announcing devices or horns for boats, automobiles, and other vehicles; and the object thereof is to provide an improved device of this class which is simple in construction and operation and which may be conveniently secured to or connected with a boat, automobile, or other vehicle in the manner of other devices of this class commonly known as "sirens" and in which the sound is produced by the rush of wind through the instrument or device caused by the motion of the boat or vehicle.

The invention is fully disclosed in the following specification, of which the accompanying drawings form a part, in which the separate parts of our improvement are designated by suitable reference characters in each of the views, and in which—

Figure 1 is a sectional longitudinal central view of our improved announcing device or horn; Fig. 2, an end view thereof; and Fig. 3, a partial section similar to that shown in Fig. 1, but showing a part of the device in full lines.

In the practice of our invention we provide a bell-shaped horn $a$ of the usual form, the smaller end of which is connected with the smaller end of a bell-shaped casing $b$, in the larger end of which is secured a disk or plate $c$, having radial slots or openings $c^2$ and provided with a tubular shank $c^3$, through which is passed a short shaft $d$, provided at its inner end and within the bell-shaped casing $b$ with a rotatable device $e$, comprising a hub $e^2$, secured on the shaft $d$ and having radial openings formed by radial fan, blade, or wing members $e^3$, arranged at an angle of about forty-five degrees.

Connected with the outer end of the shaft $d$ is a pulley $f$, preferably provided with a leather or fibrous cover $g$, and the device may be so supported as to bring the cover $g$ of the pulley $f$ in contact with the periphery of the fly-wheel of the motor of the boat, automobile, or other vehicle, and in this way the shaft $d$ and the rotary device $e$ will be rapidly revolved. The pulley $f$, however, may be geared in connection with any rotatable part of the motor, and the device as a whole may be secured to the boat, automobile, or other vehicle at any preferred point and in any desired manner or in the manner of other devices of this class, and any suitable means may be provided for throwing the pulley $f$ out of connection with the power by which it is driven, and thus stop the rotation of the shaft $d$.

It will be understood that the horn or siren only operates when the shaft $d$ and the part $e$ are rotated, it being understood that the horn $a$ of the device should be directed forwardly at all times in order to secure the proper operation or to produce the desired sound, it being understood that the desired sound is produced by the rush of air through the instrument when the boat or vehicle is in motion, at which time the part $e$ is rapidly revolved.

The part or device $e$ consists of the hub $e^2$, the radial blades or wings $e^3$, and a ring or band $e^4$, which engages and is formed integrally with the periphery of said blades or wings, and said ring or band when the parts are in operative position is adjacent to the disk $c$, and in Fig. 1 of the drawings said ring or band is shown in section, as are also two of the radial blades or wings $e^3$.

Having fully described our invention, what we claim as new, and desire to secure by Letters Patent, is—

1. An announcing device or horn of the class described, comprising a hollow bell-shaped casing, a horn connected with the smaller end thereof, a plate secured in the larger end thereof and provided with radial openings and a tubular shank projecting therefrom, and a shaft passing through said shank and provided within said casing with a rotatable device having inclined radial wings or blades between which are radial openings, substantially as shown and described.

2. An announcing device or horn of the class described, comprising a hollow bell-shaped casing, a horn connected with the smaller end thereof, a plate secured in the larger end thereof and provided with radial openings and a tubular shank projecting therefrom, and a shaft passing through said shank and provided within said casing with a rotatable device having inclined radial wings or blades between which are radial openings, said shaft being also provided at its outer end with a pulley, substantially as shown and described.

3. An announcing device or horn of the class described, comprising a hollow bell-shaped casing, a horn connected with the smaller end thereof, a plate secured in the larger end thereof and provided with radial openings, and a shaft passing through said plate and provided within said casing with a rotatable device having radially-arranged openings, said shaft being also provided at its outer end with means whereby it may be turned, substantially as shown and described.

In testimony that we claim the foregoing as our invention we have signed our names, in presence of the subscribing witnesses, this 20th day of May, 1905.

FERDINAND TAUZIN.
    HENRY LAURY.

Witnesses:
 J. LILOU VEYWING,
 HENRY RUNLIS.